(12) United States Patent
Wenzel

(10) Patent No.: US 11,080,237 B2
(45) Date of Patent: Aug. 3, 2021

(54) STALE DATA DETECTION

(71) Applicant: NetApp Inc., Sunnyvale, CA (US)

(72) Inventor: Thomas Rudolf Wenzel, Almere (NL)

(73) Assignee: NetApp, Inc., San Jose, CA (US)

( * ) Notice: Subject to any disclaimer, the term of this patent is extended or adjusted under 35 U.S.C. 154(b) by 27 days.

(21) Appl. No.: 16/456,485

(22) Filed: Jun. 28, 2019

(65) Prior Publication Data
US 2019/0317918 A1   Oct. 17, 2019

Related U.S. Application Data

(63) Continuation of application No. 14/813,664, filed on Jul. 30, 2015, now Pat. No. 10,372,676.

(51) Int. Cl.
| | |
|---|---|
| *G06F 16/11* | (2019.01) |
| *G06F 16/16* | (2019.01) |
| *G06F 16/23* | (2019.01) |
| *G06F 16/17* | (2019.01) |

(52) U.S. Cl.
CPC .......... *G06F 16/162* (2019.01); *G06F 16/125* (2019.01); *G06F 16/1727* (2019.01); *G06F 16/2358* (2019.01)

(58) Field of Classification Search
CPC .. G06F 16/2237; G06F 16/125; G06F 16/162; G06F 16/1727; G06F 16/2358; G06F 16/221; G06F 16/128; G06F 16/22; G06F 16/275; G06F 16/284; G06F 16/27; G06F 16/23; G06F 16/273; G06F 16/283; G06F 16/2329; G06F 16/2365; G06F 16/24564
See application file for complete search history.

(56) References Cited

U.S. PATENT DOCUMENTS

| | | |
|---|---|---|
| 5,764,972 A | 6/1998 | Crouse et al. |
| 6,101,508 A | 8/2000 | Wolff |
| 6,442,549 B1 | 8/2002 | Schneider et al. |
| 6,484,186 B1 | 11/2002 | Rungta |
| 7,996,366 B1 | 8/2011 | Smith |
| 8,688,935 B1 | 4/2014 | Yochai et al. |
| 9,141,539 B2 | 9/2015 | Ahmad |
| 9,191,443 B2 | 11/2015 | Hesselink et al. |
| 2004/0139128 A1 | 7/2004 | Becker et al. |
| 2006/0010301 A1 | 1/2006 | Yagawa |

(Continued)

*Primary Examiner* — Robert W Beausoliel, Jr.
*Assistant Examiner* — Nirav K Khakhar
(74) *Attorney, Agent, or Firm* — Cooper Legal Group, LLC

(57) ABSTRACT

One or more techniques and/or systems are provided for detecting stale data and/or changed data. For example, a bitmap file may be maintained and mapped to an inofile describing various states of files of a file system. The bitmap file may be populated with bitmap records indicating whether files were accessed, modified, or have other states. The bitmap file may efficiently convey information used to determine whether files have not been accessed recently (e.g., stale data) or were recently modified (e.g., changed data) compared to the inofile because the bitmap file may comprise a fraction of the size of the inofile (e.g., a byte of information may be used to represent various states of one or more files). In this way, instead of evaluating a relatively larger inofile, the bitmap file may be evaluated to efficiently identify stale data for deletion or destaging and/or changed data for backup.

20 Claims, 7 Drawing Sheets

(56) References Cited

U.S. PATENT DOCUMENTS

| | | |
|---|---|---|
| 2007/0226266 A1 | 9/2007 | Lee et al. |
| 2007/0260830 A1 | 11/2007 | Faibish et al. |
| 2009/0198883 A1 | 8/2009 | Fortin et al. |
| 2010/0306172 A1 | 12/2010 | Gopalakrishnan |
| 2011/0258164 A1 | 10/2011 | Mandagere et al. |
| 2012/0239860 A1 | 9/2012 | Atkisson et al. |
| 2013/0151754 A1 | 6/2013 | Post et al. |
| 2015/0088811 A1 * | 3/2015 | Hase .................. G06F 16/23 707/607 |
| 2016/0292250 A1 | 10/2016 | Chen et al. |

* cited by examiner

US 11,080,237 B2

STALE DATA DETECTION

RELATED APPLICATION

This application claims priority to and is a continuation of U.S. patent application Ser. No. 14/813,664, titled "STALE DATA DETECTION" and filed on Jul. 30, 2015, which is incorporated herein by reference.

BACKGROUND

A file system of a computing device or storage environment may comprise an ever growing amount of user data. For example, a storage network environment may provide thousands of clients with access to millions of files stored across various storage devices, which may be replicated to other storage devices. Data storage costs and performance may decrease as the number and size of information is managed. In an example, a metadata file, such as an inofile, may be used to track information relating to files of a file system. The inofile may be a continue file comprising inofile records for each file. An inofile record may specify a file size, a device ID, a user ID, a group ID, a file mode, a last access time, a last modification time, pointers, and/or a variety of other information about a file.

An application, service, and/or storage administrator may desire to identify stale data that has not been accessed for a threshold amount of time such as for removal or destaging of stale data to slower and cheaper storage (e.g., a home directory of an ex-employee, a file not accessed for a predefined amount of days, an unmapped logical unit number (LUN), etc.) and/or to identify recently changed data such as for data backup purposes. Accordingly, the inofile may be completely walked to identify when files were last accessed or modified. Unfortunately, walking the complete inofile may be time consuming and resource intensive because the inofile may be relatively large (e.g., an inofile may consume 18 gigabytes of metadata for a volume with 100 mio inodes).

DETAILED DESCRIPTION

Figure 1:
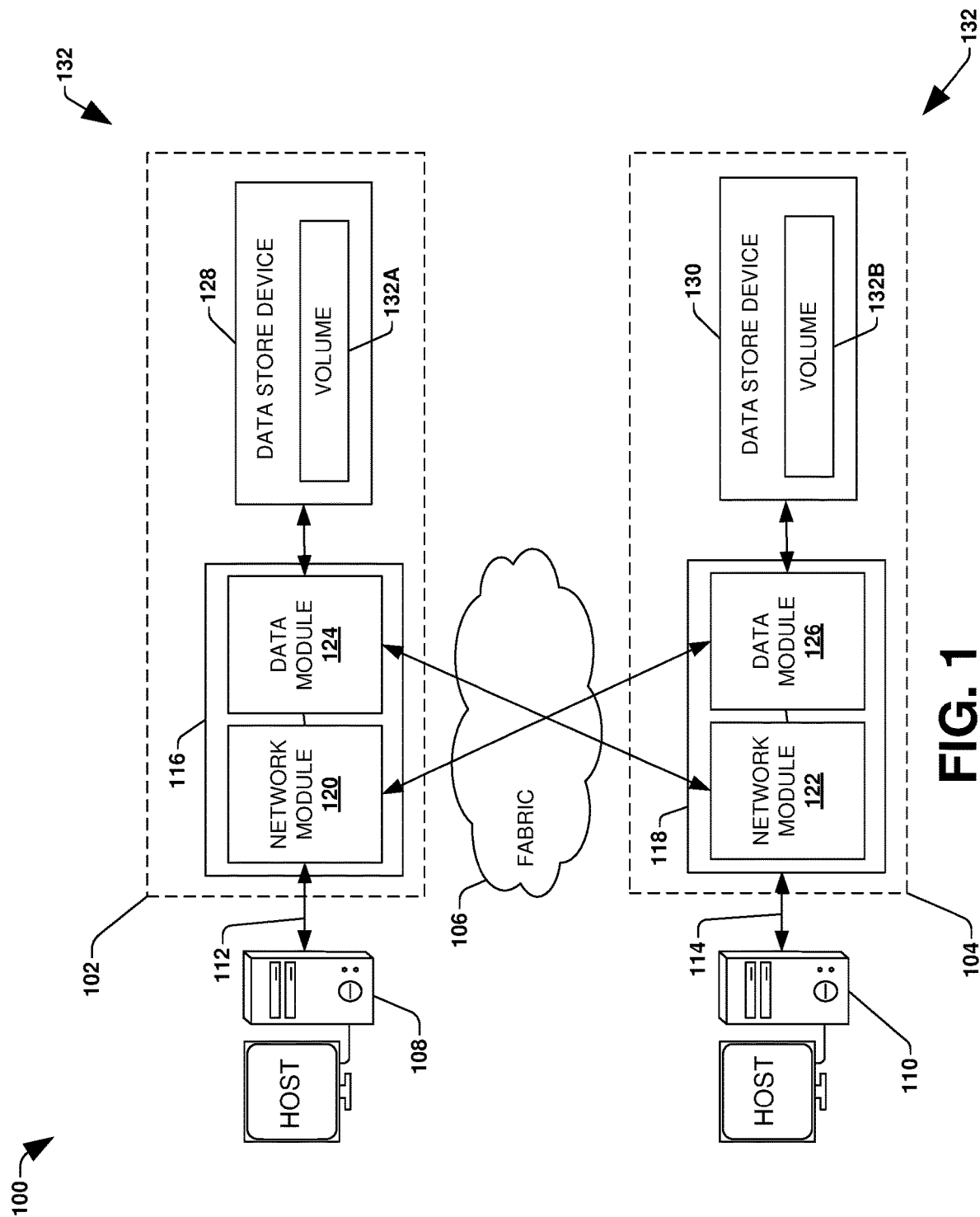
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for detecting stale data and/or changed data are provided. For example, a bitmap file may be created and maintained for storing access and/or modification information of files in an efficient manner (e.g., a single byte may be used to represent various states of one or more files, such as 4 bits used to represent state information of a first file and 4 bits used to represent state information of a second file). The bitmap file may comprise bitmap records that match to metadata records of a metadata file, such as inofile records of an inofile for a file system (e.g., a bitmap record may map to a last access time property and/or a last modified time priority within an inofile record). Because the bitmap file may efficiently store access information of files compared to the metadata file (e.g., the inofile may comprise 18 gigabytes or any other size of file metadata, whereas the bitmap file may merely comprise 45 megabytes or any other size of file metadata for the same number of files), stale data and/or changed data may be quickly identified by walking the bitmap file (e.g., and/or other bitmap files corresponding to various points in time of the file system) instead of walking the entire inofile, which may necessitate complex decisions because timestamps may be recorded and compared as opposed to merely evaluating a simple "yes/no" flag within the bitmap file. Quickly identifying stale data and/or changed data may conserve computing resources and/or time otherwise used by backup services, data consolidation services, stale data removal services, data destaging services, and/or other data management services.

To provide context for detecting stale data, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Storage Area Network (SAN) protocols (e.g., Internet Small Computer System Interface (iSCSI) and/or Fiber Channel Protocol (FCP) may be used to access a LUN) and/or Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI), Serial Attached SCSI (SAS), or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that detecting stale data may be implemented within the clustered network environment 100 or any other computing environment (e.g., a personal computer, a laptop, a mobile device, a smart device, a server, a videogame console, etc.). For example, a data evaluation component may be implemented for the node 116 and/or the node 118. The data evaluation component may be configured to maintain one or more bitmap files mapped to metadata files, such as inofiles, of file systems hosted by the node 116 and/or the node 118. The data evaluation component may evaluate the one or more bitmap files to identify stale data that has not been accessed for a threshold amount of time and/or to identify changed data. It may be appreciated that detecting stale data may be implemented for and/or between any type of computing environment, and may be transferrable between physical devices (e.g., node 116, node 118, etc.) and/or a cloud computing environment (e.g., remote to the clustered network environment 100).

Figure 2:
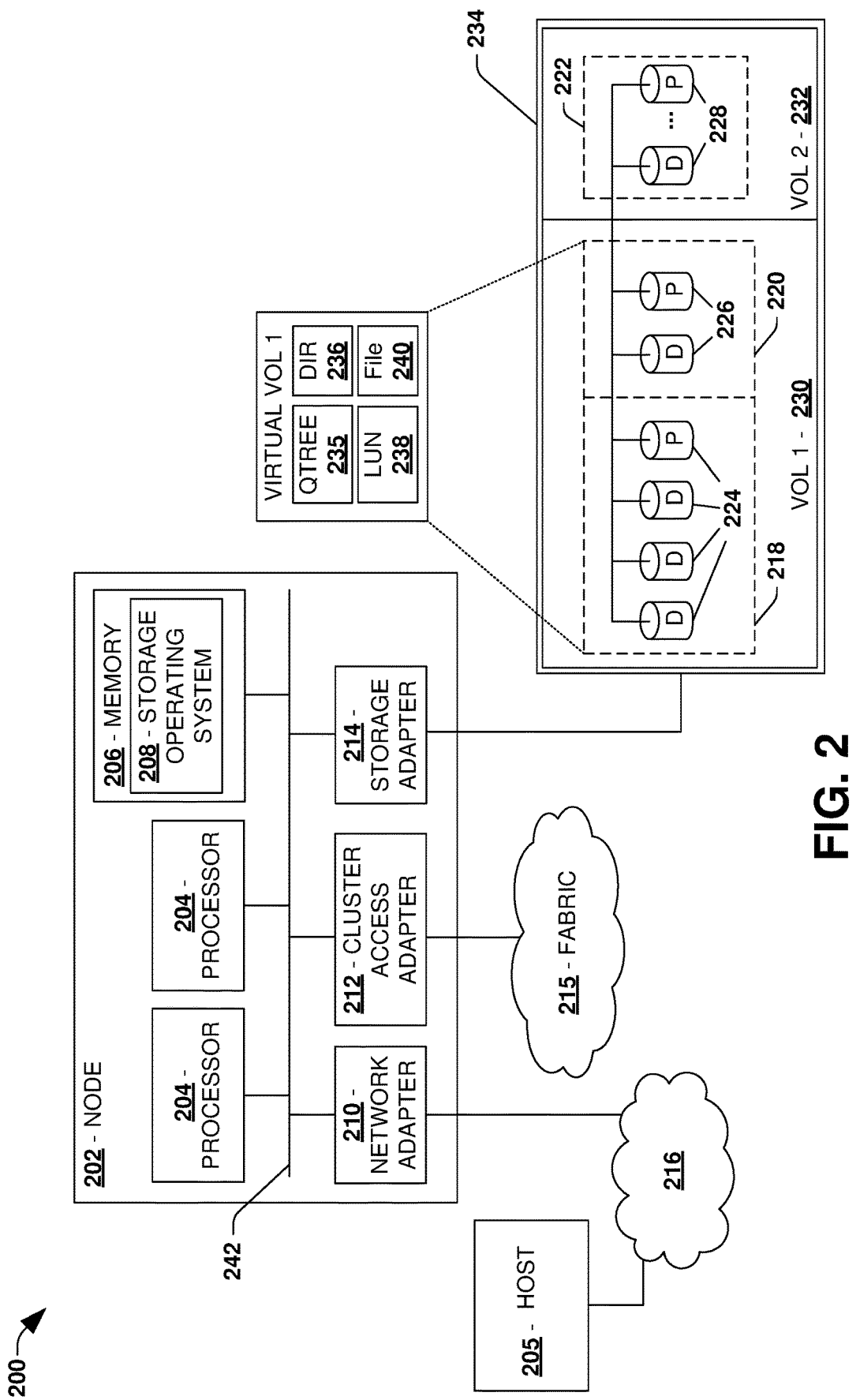
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that detecting stale data may be implemented for the data storage system 200 or any other computing environment (e.g., a personal computer, a laptop, a mobile device, a smart device, a server, a videogame console, etc.). For example, a data evaluation component may be implemented for the node 202. The data evaluation component may be configured to maintain one or more bitmap files mapped to metadata files, such as inofiles of file systems hosted by the node 202. The data evaluation component may evaluate the one or more bitmap files to identify stale data that has not been accessed for a threshold amount of time and/or to identify changed data. It may be appreciated that detecting stale data may be implemented for and/or between any type of computing environment, and may be transferrable between physical devices (e.g., node 202, host 205, etc.) and/or a cloud computing environment (e.g., remote to the node 202 and/or the host 205).

Figure 3:
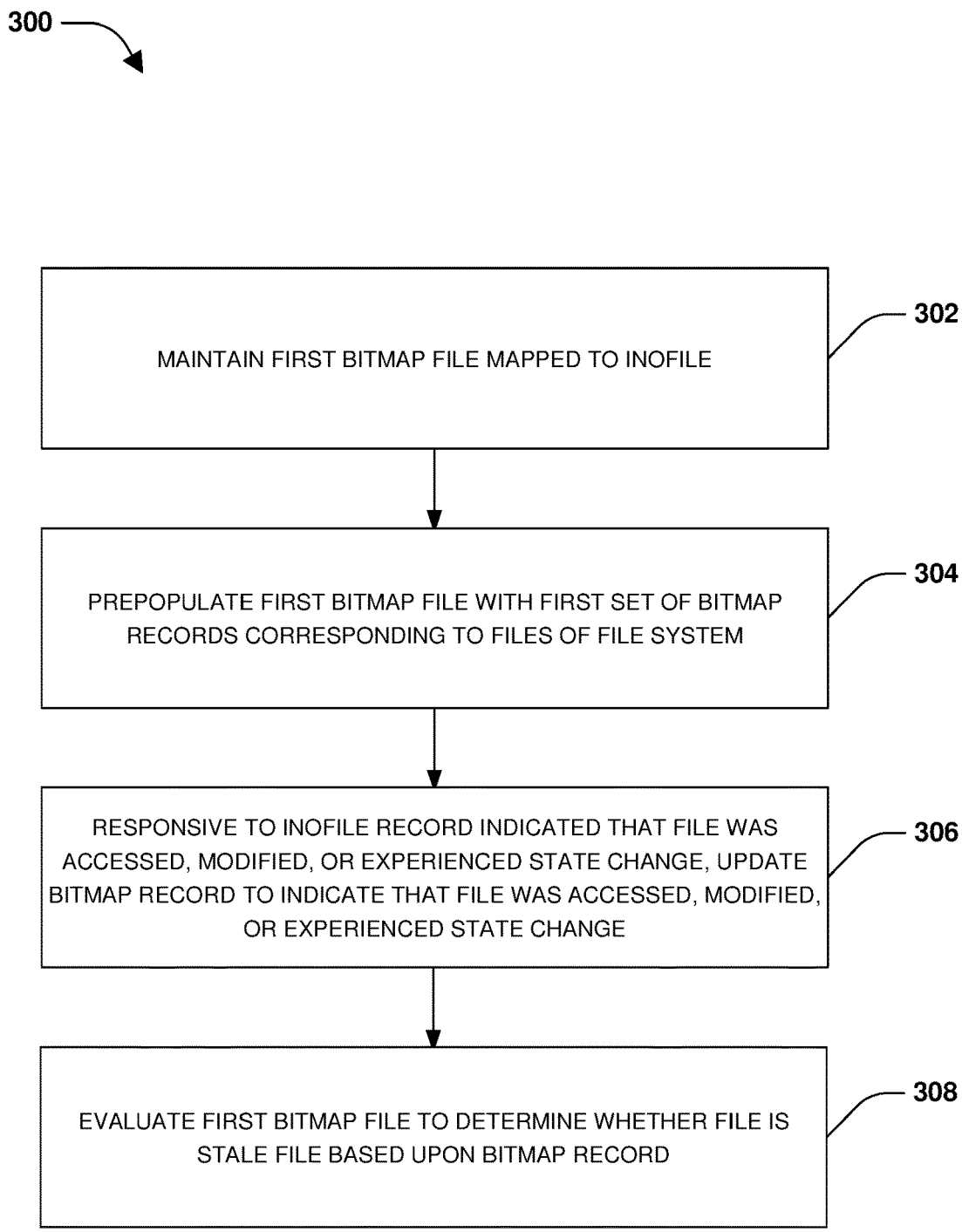
FIG. 3 is a flow chart illustrating an exemplary method of detecting stale data.

One embodiment of detecting stale data is illustrated by an exemplary method 300 of FIG. 3. A file system may comprise numerous files, such as user data. For example, the file system may be hosted across one or more volumes, logical unit numbers (LUNs), storage devices, etc. Metadata, describing the files (e.g., a file size, a device identifier, a link count, a last access time, a last modified time, a file mode, etc.), may be stored within a metadata file such as an inofile or any other metadata data structure or file. Because the inofile may comprise a continuous file of metadata for a relatively large number of files, the inofile may be relatively large (e.g., the inofile may be 18 gigabytes for a volume with 100 mio inodes). The entire inofile may be walked to identify files that have recently changed (e.g., recently modified files whose changes should be backed up) or not changed within a threshold amount of time (e.g., stale files), which may consume a relatively large amount of processing resources and time due to the size of the inofile. Accordingly, a first bitmap file, mapped to the inofile, may be maintained for efficiently storing various states of a file such as whether a file was accessed/modified, at 302.

It may be appreciated that bitmap files may be mapped to any metadata (e.g., inofiles, registry information, inodes, file system metadata, database records, volume metadata, LUN metadata, etc.) that may provide an indication as to when a file was last accessed, modified, and/or other various states of files.

At 304, the first bitmap file may be prepopulated with a first set of bitmap records corresponding to files of the file system. For example, a bitmap record of the first set of bitmap records may specify whether a file has been accessed, modified, or experienced a state change. The bitmap record may be mapped to an inofile record, of the inofile, for the file. In an example, the bitmap record may comprise a bit representing a flag indicative of whether the file has been accessed and/or modified. In another example, the bitmap record may comprise a bit representing a flag indicative of whether a file is present within the file system (e.g., the bit comprises a "1" value indicating that the file (e.g., an entry) is used within the inofile and thus the file should be examined for stale data detection) or not (e.g. the bit comprises a "0" value indicating that the file (e.g., the entry) is not used within the inofile and thus the file does not need to be examined for stale data detection). In another example, the first bitmap file may comprise a byte representing states of two files, such as representing a first state of a first file using a first bit (e.g., whether the first file has been accessed), a second state of the first file using a second bit (e.g., whether the first file has been modified), a third state of the first file using a third bit (e.g., a state representing any other information about the file such as whether the file is a new file, the file is a backup file, the file violates a size recommendation, etc.), a inode in use state of the first file using a fourth bit, a fourth state of a second file using a fifth bit, a fifth state of the second file using a sixth bit, a sixth state of the second file using a seventh bit, and/or a second inode in use state for the second file using an eighth bit. Because merely a few bits are used to represent states of a file (e.g., which may be indicative of whether a file has been accessed, modified, etc.), the bitmap file is relatively small and efficient to evaluate for identifying changed files or stale files that have not been accessed within a threshold amount of time (e.g., the bitmap file may merely comprise 45 megabytes or any other size instead of 18 gigabytes of the inofile for a particular number of files). For example, an inofile may use 192 bytes, whereas an entry within the bitmap file may represent a presence of a file and 3 states of the file using merely 0.5 bytes.

At 306, responsive to the inofile record indicating that the file was accessed, modified, or experienced a state change, the bitmap record may be updated to indicate the file was accessed. For example, the bitmap record may be updated based upon a last accessed or modified property within the inofile record for the file. In an example, the first set of bitmap records of the first bitmap file may be populated based upon a first snapshot of the file system corresponding to a first point in time or may be populated in real-time during active operation of the file system.

At 308, the first bitmap file may be evaluated to determine whether the file is a stale file based upon the bitmap record. It may be appreciated that in some examples multiples bitmap files, representing states of files at various points in time, may be evaluated to determine whether files are stale or have been recently modified, as will be discussed later. The file may be determined as the stale file based upon the first bitmap file indicating that the file has not been accessed for a threshold amount of time. Responsive to determining that the file is the stale file, the stale file may be deleted or may be destaged from a current storage device (e.g., a relatively faster and/or more expensive primary storage) to a secondary storage device (e.g., a relatively slower and/or cheaper secondary storage), for example. In another example, an alert or a list is created to notify a user about stale files so that the user may decide further actions. For example, a state of a certain file may be ignored for stale data detection, such as by using a bit of a bitmap record (e.g., the bit may indicating whether the file is to be ignored or evaluated). In another example, a storage management operation may be implemented for the stale file (e.g., backup, replication, ownership change, size change, migration, a policy change, a storage operation change, etc.).

In an example, the first bitmap file may be evaluated to determine whether a LUN is a stale LUN. For example, the LUN may be determined to be the stale LUN based upon the LUN not being mapped or the LUN not being accessed for a threshold amount of times (e.g., a bit within a bitmap file, which may be useful where LUNs are dynamically mapped and mounted; a scanner may evaluate LUN metadata that records LUN mappings; etc.). In another example, a home directory of a user may be determined as being a stale home directory based upon an evaluation of the first bitmap file (e.g., one or more bitmap files may indicate that files of an employee have not been accessed for a threshold amount of time, which may be indicative of the employee being an ex-employee). In another example, the first bitmap file may be evaluated to identify one or more changed files of the file system. A backup operation may be invoked based upon the one or more changed file, such that the backup operation efficiently backs up merely data of changed files that are quickly identified from the one or more bitmap files.

Stale files and/or changed files may be efficiently identified by merely accessing one or more bitmap files without accessing the inofile. For example, a bitmap file evaluation operation may be performed upon the first bitmap file to identify one or more stale files of the file system. The bitmap file evaluation operation may be configured to evaluate the first bitmap file but not the inofile. It may be appreciated that any number of bitmap files may be evaluated without accessing inofiles. Responsive to identifying one or more stale or changed files using the bitmap file evaluation operation, an inofile access operation may be performed to identify supplemental information (e.g., file size information, device ID information, etc.), from the inofile, used by a storage management operation or other service or application. In this way, the service may be invoked to execute upon the stale or changed files using the supplemental information.

In an example, multiple bitmap files may be maintained for the file system, where respective bitmap files may correspond to states of files at various points in time. For example, the first bitmap file may correspond to states of files at a first point in time of a first snapshot of the file system (e.g., captured on Monday of week 1, and used as a baseline reference for populating a bitmap file), a second bitmap file may correspond to states of files at a second point in time of a second snapshot of the file system (e.g., captured on Monday of week 2), a third bitmap file may correspond to states of files at a third point in time of a third snapshot of the file system (e.g., captured on Monday of week 3), a fourth bitmap file may correspond to real-time current states of files during active operation of the file system, etc. The first bitmap file may be initialized based upon metadata, such as the inofile (e.g., initialized to populate flag bits representing in use files that are present within the file system and mapped to inodes). In an example, subsequent bitmap files may utilize a previous bitmap as a basis, such as where state bits representing states of files are cleared (e.g., set to 0) and flag bits representing in use files are retained, or where permanent bits are retained (e.g., flag bits and bits indicative of whether a file is to be evaluated or ignored for stale data detection) and other bits are cleared (e.g., reset to 0).

In an example of rotating bitmap files, once the first bitmap file is initialized, the first bitmap file may be frozen at a first point in time (e.g., at a stopping point to update a file or as part of making a snapshot such that the first bitmap is locked, along with data, into the snapshot, and a second bitmap file is created (e.g., "rotated to" for actively tracking the active file system)). In an example of rotating between the first bitmap file and the second bitmap file, a copy of the first bitmap file is created as the second bitmap file. Tracking bits are zeroed out (e.g., bits, used to track a state of a file, such as access, modification, and/or other states, are set to 0). Flag bits (e.g., bits used to indicate whether a file is in use) and/or configurable state bits (e.g., bits used to indicated whether a file is to be ignored for stale data detection, backup, triggering an alert, etc.) will be retained as opposed to being reset to 0. Once the second bitmap file is created and initialized, the first bitmap file is frozen (e.g., updates to the first bitmap file are stopped), and updates are now done to the second bitmap file.

The bitmap files may be evaluated to identify stale files. For example, a stale data threshold may specify that a file is stale if the file has not been accessed within 20 days. The first bitmap file, the second bitmap file, the third bitmap file, etc. may be evaluated to determine whether any files were not accessed within 20 days during weeks 1-3 (e.g., bitmap records, for file (A), within the first bitmap file, the second bitmap file, the third bitmap file, and the fourth bitmap file may indicate that file (A) was not accessed during weeks 1-3, and thus file (A) may be determined as stale). In this way, changed files and/or stale files may be efficiently identified by evaluating one or more relatively small bitmap files.

In an example of maintaining a bitmap file, if a file is deleted, then bits of a corresponding bitmap record are cleared (e.g., set to 0 to indicate that the file is not in use and all states are 0). In another example, if a new file is created, certain bits within a corresponding bitmap record may be set (e.g., a flag bit may be set to 1 to indicate that the file is in use, while another bit, such as a modification bit, may be set to indicate that the file was created/modified so that the file is not detected as being stale shortly after creation).

Figure 4:
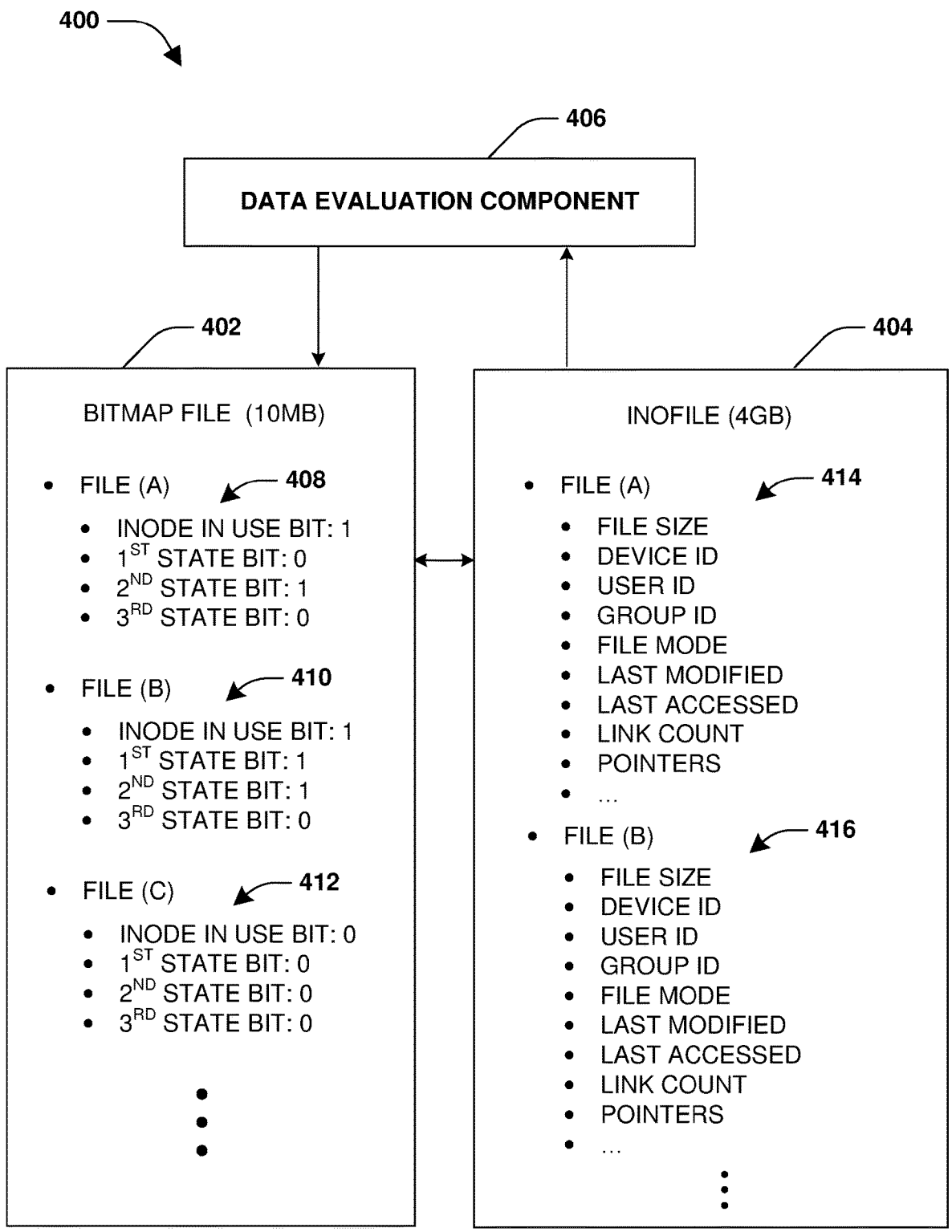
FIG. 4 is a component block diagram illustrating an exemplary computing device for maintaining a bitmap file.

FIG. 4 illustrates an example of a system 400, comprising a data evaluation component 406, for maintaining a bitmap file 402 of a file system. The data evaluation component 406 may prepopulate the bitmap file 402 with a set of bitmap records, such as a file (A) bitmap record 408, a file (B) bitmap record 410, a file (C) bitmap record 412, and/or other bitmap records, based upon information within inofile records of an inofile 404 for the file system, such as a file (A) inofile record 414, a file (B) inofile record 416, a file (C) inofile record, and/or other inofile records. In an example, the bitmap file 402 may have a one-to-one mapping with the inofile 404 (e.g., an entry within the bitmap file 402 corresponds to an inode of a file). It may be appreciated that the bitmap file 402 may be populated with information from any type of metadata or information source that may indicate when files were last accessed, last modified, and/or other states of files.

In an example, various information of a file (A) may be represented through one or more bits of the file (A) bitmap record 408, such as where a first bit represents whether an inode (A) of file (A) is in use or not, a second bit represents a first state of the file (A) (e.g., whether the file (A) has been accessed), a third bit represents a second state of the file (A) (e.g., whether the file (A) has been modified), a forth bit represents a third state of the file (A), etc. In this way, states of two files may be maintained using merely a byte of information or any other amount of information. It may be appreciated that any number of bits may be used to represent any number of states of a file. The states may be set based upon corresponding information within the inofile records (e.g., the second bit of the file (A) bitmap record 408 may be set based upon a last modified property within the file (A) inofile record 414, the third bit of the file (A) bitmap record 408 may be set based upon a last modified property within the file (A) inofile record 414, etc.).

Figure 5:
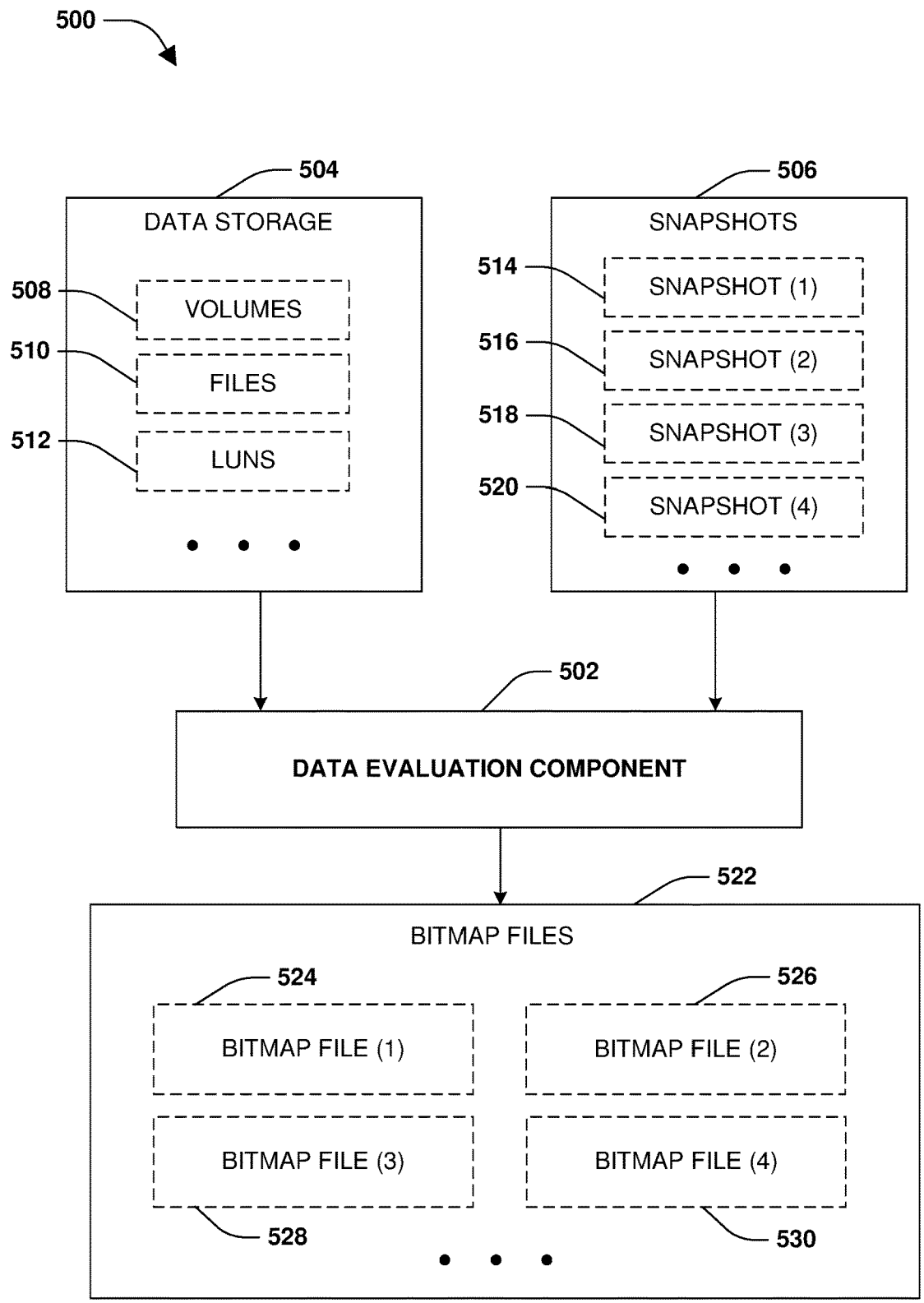
FIG. 5 is a component block diagram illustrating an exemplary computing device for maintaining a set of bitmap files.

FIG. 5 illustrates an example of a system 500, comprising a data evaluation component 502, for maintaining a set of bitmap files 522 for a file system corresponding to volumes 508, files 510, LUNs 512, and/or other data stored within one or more storage devices of data storage 504. A set of snapshots 506 of the file system may have been created at various points in time, such as a first snapshot 514 at a first point in time during week 1, a second snapshot 516 at a second point in time during week 2, a third snapshot 518 at a third point in time during week 3, a fourth snapshot 520 at a fourth point in time during week 4, etc.

The data evaluation component 502 may maintain and populate the set of bitmap files 522 based upon states of an inofile, of the file system, captured within the set of snapshots 506. In an example, a first bitmap file 524 may be populated with information from the inofile at a first state represented within the first snapshot 514, a second bitmap file 526 may be populated with information from the inofile at a second state represented within the second snapshot 516, a third bitmap file 528 may be populated with information from the inofile at a third state represented within the third snapshot 518, a fourth bitmap file 530 may be populated with information from the inofile at a fourth state represented within the fourth snapshot 520. In another example, after the first bitmap file 524 is populated, updates to bitmap files may occur in conjunction with updates to other metadata, such as the inofile. For example, whenever a file is accessed or changed, the inofile is updated to reflect such. Similarly, appropriate bits in a corresponding entry of a bitmap file are updated as well, which may mitigate wasted time and resources otherwise used to deploy a scanner for moving entries from a source metadata file to the bitmap file. In this way, the set of bitmap files 522 may indicate whether files were accessed, modified, and/or other states of files during weeks 1-4.

Figure 6:
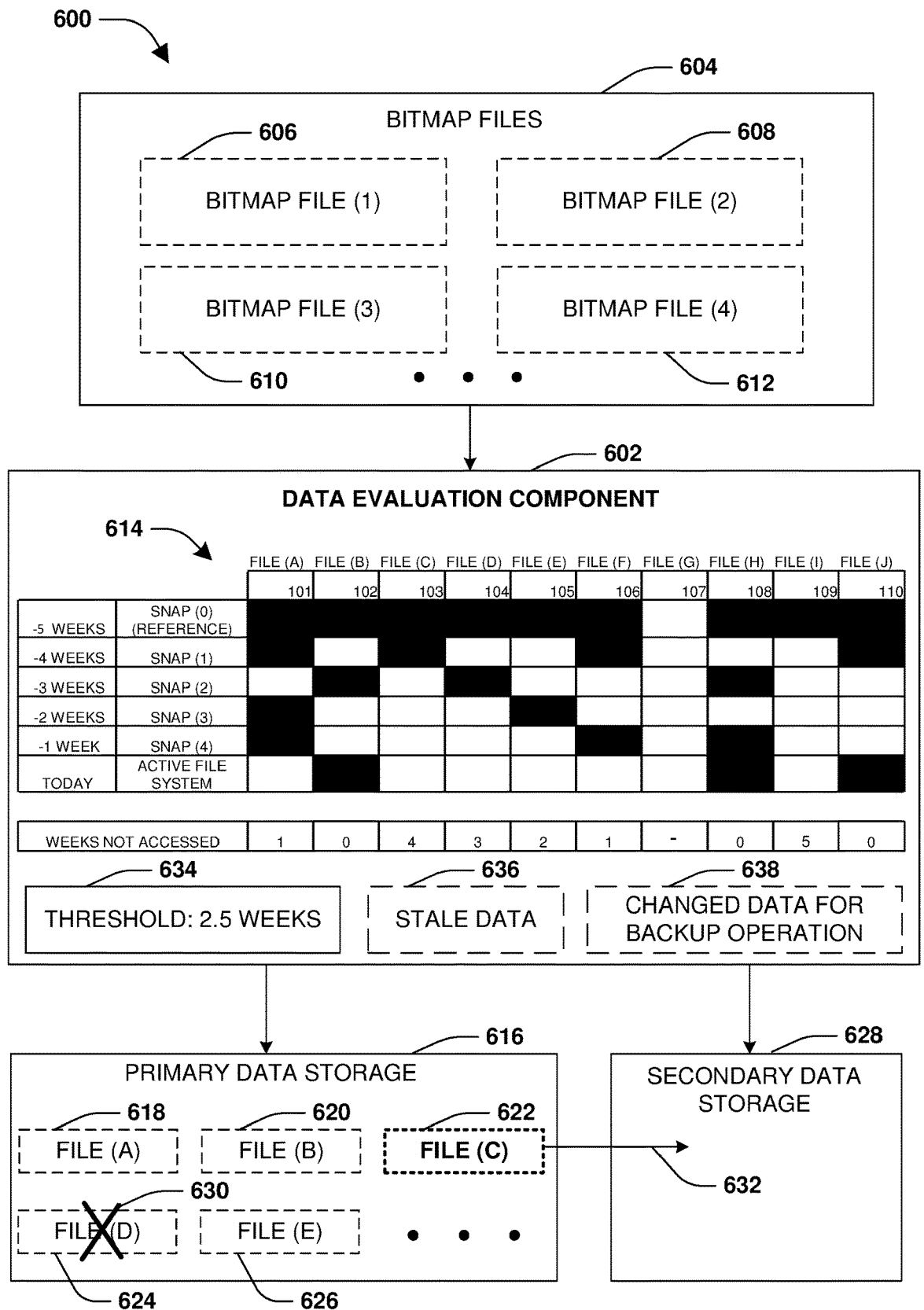
FIG. 6 is a component block diagram illustrating an exemplary computing device for identify stale data and/or changed data.

FIG. 6 illustrates an example of a system 600, comprising a data evaluation component 602, for identifying stale data 636 and/or changed data 638. For example, the data evaluation component 602 may maintain a stale data threshold 634 indicating that data is stale if the data has not been accessed for at least 2.5 weeks. The data evaluation component 602 may evaluate 614, using the stale data threshold 634, a set of bitmap files 604, such as a first bitmap file 606 representing states of files at a first point in time 5 weeks prior to a current date (e.g., a state between a time the first bitmap file 606 was initialized, such as being prepopulated, and a time at which the first bitmap file 606 was frozen, such as by the creation of a snapshot, and thus a second bitmap file 608 is created) and corresponding to a base snapshot of a file system, the second bitmap file 608 representing states of files at a second point in time 4 weeks prior to the current date (e.g., a 1 week period between the initialization of the second bitmap file 608 and the second bitmap file 608 being frozen, and thus a third bitmap file 610 is created) and corresponding to a first snapshot of the file system, the third bitmap file 610 representing states of files at a third point in time 3 weeks prior to the current date (e.g., a 1 week period between the initialization of the third bitmap file 610 and the third bitmap file 610 being frozen, and thus a fourth bitmap file 612 is created) and corresponding to a second snapshot of the file system, the fourth bitmap file 612 representing states of files at a fourth point in time 2 weeks prior to the current date (e.g., a 1 week period between the initialization of the fourth bitmap file 612 and the fourth bitmap file 612 being frozen, and thus a fifth bitmap file is created) and corresponding to a third snapshot of the file system, the fifth bitmap file representing states of files at a fifth point in time 1 week prior to the current date (e.g., a 1 week period between the initialization of the fifth bitmap file and the fifth bitmap file being frozen, and thus an active bitmap file is created) and corresponding to a fourth snapshot of the file system, and the active bitmap file corresponding to a current real-time active state of the file system. At any given time, merely one bitmap may be active for the file system (e.g., the active bitmap file), while previous bitmaps may represent states between when such bitmap files were initialized and frozen. Thus, a time a file has not been accessed may be calculated based upon a time of the active bitmap file (e.g., a latest bitmap) to the next older bitmap file+a time to the next older bitmap file.

In an example, each bitmap may represent 1 week of tracking states of files. The bitmaps may be evaluated to identify files that have not been accessed for 2.5 weeks or longer (e.g., 18 days or longer). A first time between the active bitmap file and the fifth bitmap file (e.g., representing 1-7 days), a second time between the fifth bitmap file and the fourth bitmap file 612 (e.g., representing 7 days), a third time between the fourth bitmap file 612 and the third bitmap file 610 (e.g., representing 7 days), a fourth time between the third bitmap file 610 and the second bitmap file 608 (e.g., representing 7 days), etc. may be evaluated. If the first time is 1 day, then the first time+the second time+the third time is merely 15 days, and thus the fourth time is taken into account because the evaluation criteria is the identification of files that have not been accessed for 18 days or longer). If the first time is 6 days, then the first time+the second time+the third time (e.g., 20 days) provide sufficient data for evaluation. Thus, the granularity between bitmap file creation has influence on the granularity of evaluation (e.g., the more often bitmaps are frozen and rotated, the more granularity the evaluation may have, however, creating more bitmap files will result in more bitmap files to maintain and scan). Bitmap files may be frozen and rotated based upon a schedule or on demand.

In an example, the first bitmap file 606 may indicate that a file (A) 618, a file (B) 620, a file (C) 622, a file (D) 624, a file (E) 626, a file (F), a file (H), a file (I), and a file (J) were accessed 5 weeks prior to the current date. The second bitmap file 608 may indicate that the file (A) 618, the file (C) 622, the file (F), and the file (J) where accessed 4 weeks prior to the current date. The third bitmap file 610 may indicate that the file (B) 620, the file (D) 624, and the file (H) were accessed 3 weeks prior to the current date. The fourth bitmap file 612 may indicate that the file (A) 618 and the file (E) 626 were accessed 2 weeks prior to the current date. The fifth bitmap file may indicate that the file (A) 618, the file (F), and the file (H) were accessed 1 week prior to the current date. The current real-time active state of the file system may indicate that the file (B) 620, the file (H), and the file (J) have been currently accessed. In this way, the data evaluation component 602 may determine that the file (A) 618 has not been accessed within a week, the file (B) 620 has been currently accessed, the file (C) 622 has not been accessed within 4 weeks, the file (D) 624 has not been accessed within 3 weeks, the file (E) 626 has not been accessed within 2 weeks, the file (F) has not been accessed within 1 week, a file (G) does not exist, the file (H) has been currently accessed, the file (I) has not been accessed within 5 weeks, and the file (J) has been currently accessed.

The data evaluation component 602 may determine that the file (C) 622, the file (D) 624, and the file (I) are stale files because they have not been accessed within the stale data threshold 634 of not being accessed within at least the last 2.5 weeks. In an example, the data evaluation component 602 may delete 630 the file (D) 624 from primary data storage 616. In another example, the data evaluation component may destage 632 the file (C) 622 from the primary data storage 616 to secondary data storage 628 that may be slower and/or cheaper than the primary data storage 616. It may be appreciated that a variety of actions, such as user defined actions, may be implemented (e.g., destage, delete, ignore for stale data detection, etc.).

The data evaluation component 602 may be configured to identify changed data 638 that has changed since a prior backup of the primary data storage 616, such as a backup performed 2 weeks prior to the current date. For example, the data evaluation component 602 may determine that the file (A) 618, the file (B) 620, the file (F), the file (H), and the file (J) have changed within the last 2 weeks, and thus may be identified as changed data 638. The data evaluation component 602 may efficiently identify the changed data 638 by evaluating 614 the set of bitmap files 604 as opposed to an entire inofile. The data evaluation component 602 may invoke a backup operation to back up the changed data 638.

Figure 7:
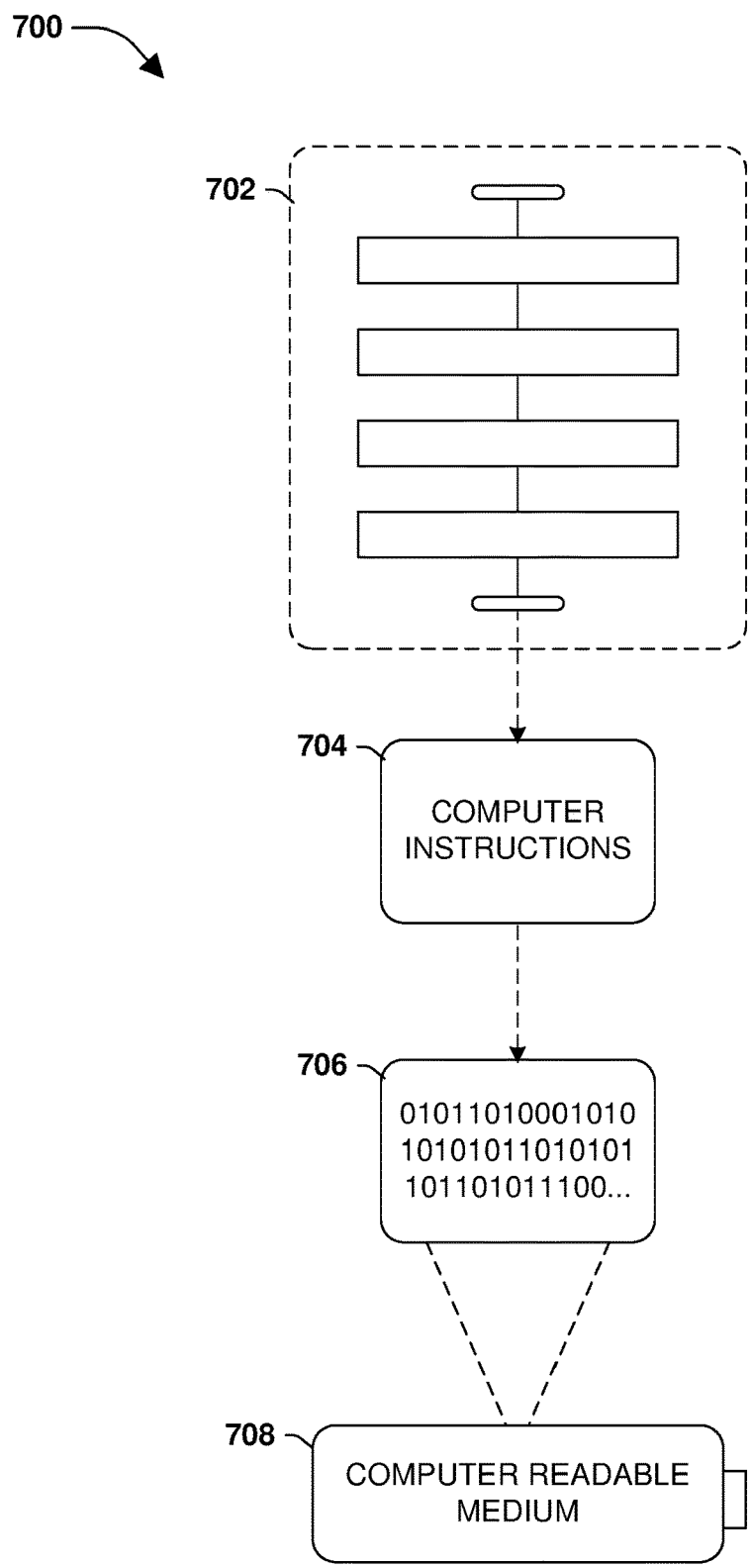
FIG. 7 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 7, wherein the implementation 700 comprises a computer-readable medium 708, such as a CD-R DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 300 of FIG. 3, for example. In some embodiments, the processor-executable instructions 704 are configured to implement a system, such as at least some of the exemplary system 400 of FIG. 4, at least some of the exemplary system 500 of FIG. 5, and/or at least some of the exemplary system 600 of FIG. 6, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    maintaining a first bitmap with a first set of records corresponding to states of files captured within a first snapshot and a second bitmap with a second set of records corresponding to the states of the files captured within a second snapshot;
    comparing the states within the first set of records of the first bitmap to the states within the second set of records of the second bitmap to determine that a file is stale based upon a comparison of a first record within the first set of records indicating whether the file was accessed when the first snapshot was created and a second record within the second set of records indicating whether the file was accessed when the second snapshot was created; and
    removing the the from storage based upon the file being stale.

2. The method of claim 1, wherein the first bitmap is mapped to an inofile.

3. The method of claim 2, wherein the inofile comprises file size information, device ID information, user ID information, pointers, last access time information, and last modification time information associated with data represented by the first snapshot.

4. The method of claim 2, wherein the first snapshot captures a file system at a point in time during which the first bitmap corresponds to the inofile.

5. The method of claim 1, wherein the first bitmap comprises a record with a bit indicative of whether the file of a file system represented by the first snapshot has been accessed.

6. The method of claim 5, wherein the record indicates whether the file is present within the file system.

7. The method of claim 5, wherein the record indicates whether the file is mapped with an inode entry.

8. The method of claim 1, wherein the first bitmap comprises a byte representing a plurality of states of a first file and a second file represented by the first snapshot.

9. The method of claim 1, comprising:
evaluating the first bitmap to identify changed files of a file system as represented by the first snapshot.

10. The method of claim 1, comprising:
evaluating the first bitmap to determine whether a home directory, represented by the first snapshot, of a user is stale.

11. The method of claim 1, comprising:
performing a bitmap evaluation operation upon the first bitmap to identify stale files of a file system represented by the first snapshot, the bitmap evaluation operation configured to evaluate the first bitmap without accessing an inofile.

12. The method of claim 11, comprising:
performing an inofile access operation to identify supplemental information from the inofile based upon identifying a stale file using the bitmap evaluation operation.

13. The method of claim 1, comprising:
maintaining a plurality of bitmaps for a plurality of snapshots of a file system, wherein the first bitmap of the first snapshot indicates whether the file of the file system was accessed at a point in time at which the first snapshot was created.

14. The method of claim 13, comprising:
comparing the plurality of bitmaps to identify whether files of the file system were modified at points in time represented by the plurality of bitmaps.

15. A non-transitory machine readable medium having stored thereon instructions which when executed by at least one machine, causes the machine to:
maintain a first bitmap with a first set of records corresponding to states of files captured within a first snapshot and a second bitmap with a second set of records corresponding to the states of the files captured within a second snapshot;
determine that a file is stale based upon a comparison of a first record within the first set of records indicating whether the file was accessed when the first snapshot was created and a second record within the second set of records indicating whether the file was accessed when the second snapshot was created; and
remove the file from storage based upon the file being stale.

16. The non-transitory machine readable medium of claim 15, wherein the first bitmap is mapped to an inofile.

17. The non-transitory machine readable medium of claim 16, wherein the inofile comprises file size information, device ID information, user ID information, pointers, last access time information, and last modification time information associated with data represented by the first snapshot.

18. The non-transitory machine readable medium of claim 16, wherein the first snapshot captures a file system at a point in time during which the first bitmap corresponds to the inofile.

19. The non-transitory machine readable medium of claim 15, wherein the first bitmap comprises a record with a bit indicative of whether the file of a file system represented by the first snapshot has been accessed.

20. A computing device, comprising:
a memory having stored thereon instructions; and
a processor coupled to the memory, the processor configured to execute the instructions to cause the computing device to:
maintain a first bitmap with a first set of records corresponding to states of files captured within a first snapshot and a second bitmap with a second set of records corresponding to the states of the files captured within a second snapshot;
compare the states within the first set of records of the first bitmap to the states within the second set of records of the second bitmap to determine that a file is not stale based upon a comparison of a first record within the first set of records indicating whether the file was accessed when the first snapshot was created and a second record within the second set of records indicating whether the file was accessed when the second snapshot was created; and
retain the file within storage-based upon the file not being stale.

* * * * *